United States Patent [19]

Byrley

[11] Patent Number: 5,018,615

[45] Date of Patent: May 28, 1991

[54] VENDING MACHINE FOR PARTICULATE COMESTIBLES

[76] Inventor: Frank D. Byrley, 12112 Madeleine Cir., Dallas, Tex. 75230

[21] Appl. No.: 365,528

[22] Filed: Jun. 13, 1989

[51] Int. Cl.[5] .......................... A23L 1/18; G07F 13/00

[52] U.S. Cl. .................................... 194/241; 209/235; 99/323.6; 99/323.7; 99/323.11

[58] Field of Search .......................... 194/241; 221/96; 222/270, 271; 209/235; 99/323.5, 323.6, 323.7, 323.8, 323.9, 323.11

[56] References Cited

U.S. PATENT DOCUMENTS

| | | | |
|---|---|---|---|
| 1,395,715 | 11/1921 | Knott | 209/235 X |
| 1,650,044 | 11/1927 | Richardson | 99/323.11 |
| 1,679,431 | 8/1928 | Longino | 99/323.11 |
| 2,134,088 | 10/1938 | Obdyke | 99/323.6 |
| 2,216,805 | 10/1940 | Case | 99/323.7 |
| 2,630,058 | 3/1953 | Hawks | 99/323.11 |
| 2,812,704 | 11/1957 | Hawks | 99/323.6 |
| 3,176,878 | 4/1965 | Hobgood et al. | 222/270 X |
| 3,618,733 | 11/1971 | Winsett | 221/96 X |
| 4,417,505 | 11/1983 | Pietrobelli | 99/323.6 |

*Primary Examiner*—F. J. Bartuska

*Attorney, Agent, or Firm*—Timmons & Kelly

[57] ABSTRACT

A vending machine for particulate comestibles that includes a conveyor screw for delivering a predetermined quantity of particulate comestibles accurately and includes a perforated plate located below the screw that functions to remove undersized particulate comestibles so that they will not be delivered to the purchaser.

7 Claims, 3 Drawing Sheets

VENDING MACHINE FOR PARTICULATE COMESTIBLES

BACKGROUND OF THE INVENTION

This invention relates generally to an improved machine for vending particulate comestibles. More particularly, but not by way of limitation, this invention relates to a coin operated machine for vending popped corn.

In the past, various machines have been designed for the purpose of vending particulate comestibles such as popped corn. Many attempts have been made in such machines to solve the problems of delivering and measuring the quantity of the comestibles purchased. Separation and removal of undersized, broken or undersirable comestibles has also been a problem in the self vending machines A number of U.S. Patents have been issued showing various forms of popped corn vending machines and the approaches taken in an attempt to solve the foregoing problems. Those patents are: No. 2,134,088, issued Oct. 25, 1938 to L. K. Obdyke; No. 2,216,805, issued Oct. 8, 1940 to B. C. Case; No. 2,630,058 issued Mar. 3, 1953 to C. G. Hawks; No. 2,812,704 issued Nov. 12, 1957 to C. G. Hawks; and No. 4,417,505 issued Nov. 29, 1983 to Silvio Pietrobelli.

An object of this invention is to provide an improved vending machine for particulate comestibles that utilizes positive feed apparatus for measuring and delivering the comestibles to the purchaser and provides for the removal of undersized or broken comestibles.

SUMMARY OF THE INVENTION

This invention provides an improved machine for vending particulate comestibles that comprises a housing having a top, two sides, a front and a rear, and a sloping bottom holding the particulate comestible and for permitting the comestible to gravitate toward the lowest part of the bottom. A screw conveyor is located proximate the lowest part of the sloping bottom and a discharge opening in the housing is located adjacent to one end of the screw conveyor A motor is provided for rotating the screw conveyor in response to a signal generated by a coin placed in a coin slot in the housing. Control means interposed between the motor and the coin slot controls the rotation of the conveyor thereby controlling the quantity of particulate comestibles delivered through the opening by the conveyor.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREPARED EMBODIMENT

Figure 1:
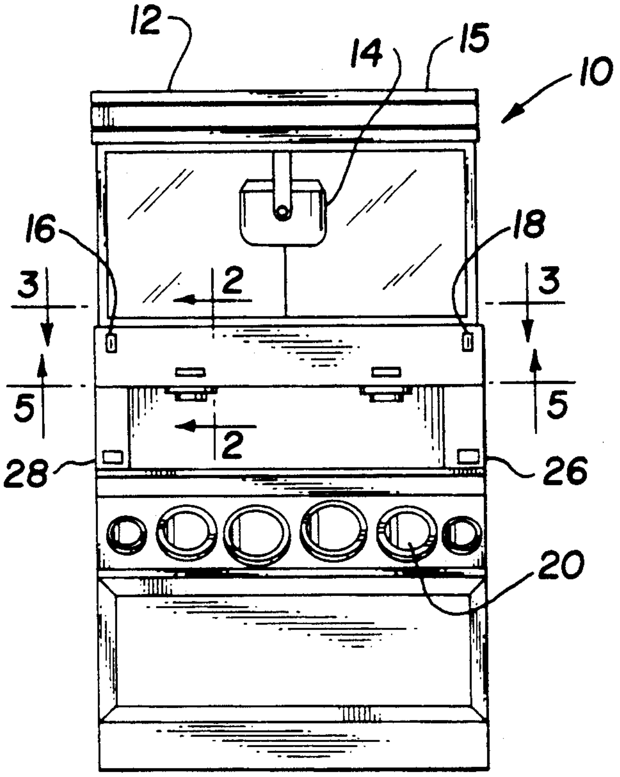
FIG. 1 is a front view of an improved machine for vending particulate comestibles that is constructed in accordance with the invention.

Referring to the drawing and to FIG. 1 in particular, shown therein and generally designated by the reference character 10 is a vending machine for particulate comestibles that is constructed in accordance with the invention. The particular machine illustrated is for vending popped corn. As illustrated, the machine includes a housing 12 having a corn popper 14 suspended therein in a position wherein popped corn can be dumped into the interior of the machine for vending. Coin slots 16 and 18 are located on the front of the machine 10. A plurality of receptacles 20 are also located in the front of the machine 10 for the purpose for receiving various sizes of containers (not shown) for the popped corn.

Figure 2:
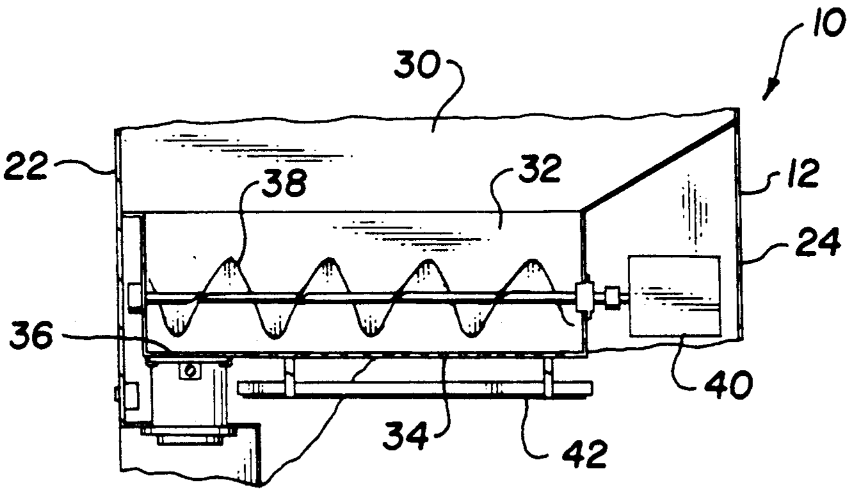
FIG. 2 is a cross-sectional view taken generally along the line 2—2 of FIG. 1 illustrating an arrangement of a screw conveyor in the vending machine of FIG. 1.

FIG. 2 is an enlarged fragmentary view of a portion of the machine 10. In addition to the top 15, the housing 12 includes a front 22 and a rear 24 that are connected by sides 26 and 28. The upper portion of the housing 12 includes a sloping bottom 30 so that corn will gravitate toward the lowermost portion thereof. As shown in FIG. 2, the lowermost portion of the bottom 30 is formed into a trough 32 having a perforated plate 34 extending across the bottom and forming the lowermost portion thereof A discharge opening 36 is located near one end of the trough 32. A conveyor screw 38, journaled in the housing 12, is located in the trough 32 and is arranged, when rotated by a motor 40 to move the popped corn toward the discharge opening 36.

As may be seen in FIG. 2, a waste receptacle 42 is located below the perforated plate 34. The receptacle 42 is provided to receive broken or undersized particulate comestibles that may drop through the perforations 34. For example, when popping corn, some of the kernels of the corn remain unpopped and portions of the corn are broken. The perforations extending through the perforated plate 34 are sized whereby undesireable sizes of particulate comestibles can drop therethrough into the receptacle 42.

Figure 3:
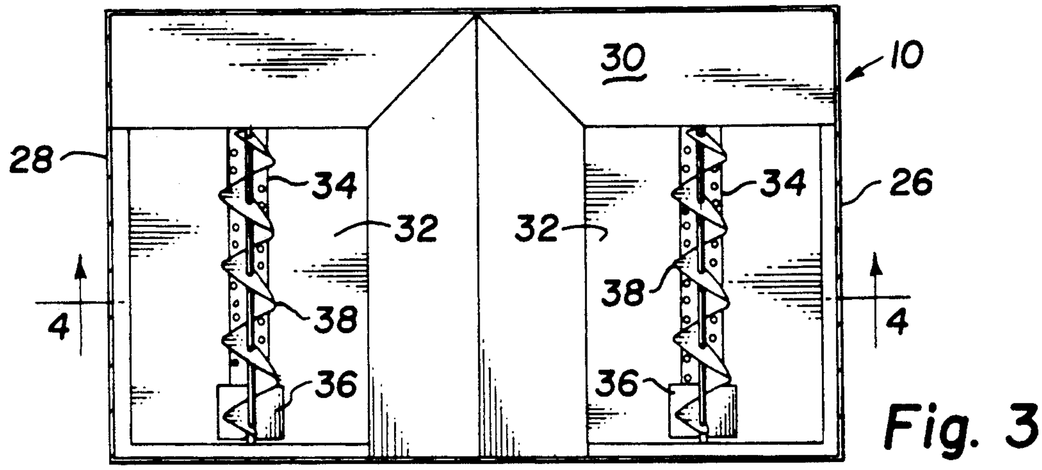
FIG. 3 is a transverse cross-sectional view taken generally along the line 3—3 of FIG. 1 also showing the arrangement of screw conveyors in the machine of FIG. 1.
Figure 4:
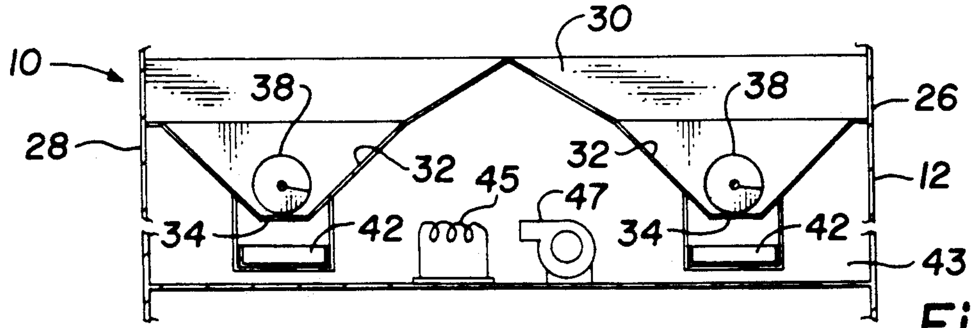
FIG. 4 is a cross-sectional view taken generally along the line 4—4 of FIG. 3 showing the relationship between the conveyor screws, troughs, and waste receptacles.

FIGS. 3 and 4 illustrate more completely the arrangement of a vending machine 10, such as that illustrated in FIG. 1, which includes two conveyor screws 38 for dispensing particulate comestibles. It will of course be understood that as illustrated, only one type of comestible is being dispensed by the machine 10, but if desired, a partition could be extended upwardly between the screws 38 dividing the machine into two separate areas for dispensing two different comestibles.

As can be seen in FIG. 4, a partition extends between the sides 26 and 28 forming a chamber 43 below the bottom 30. Mounted in the chamber 43 is a heater 45 and a blower 47. With the heater 45 and blower 47 operating, a slight pressure is built up in the chamber 43 so that heated air flows upwardly through the perforations in the plates 34 filtering through the popcorn.

Figure 5:
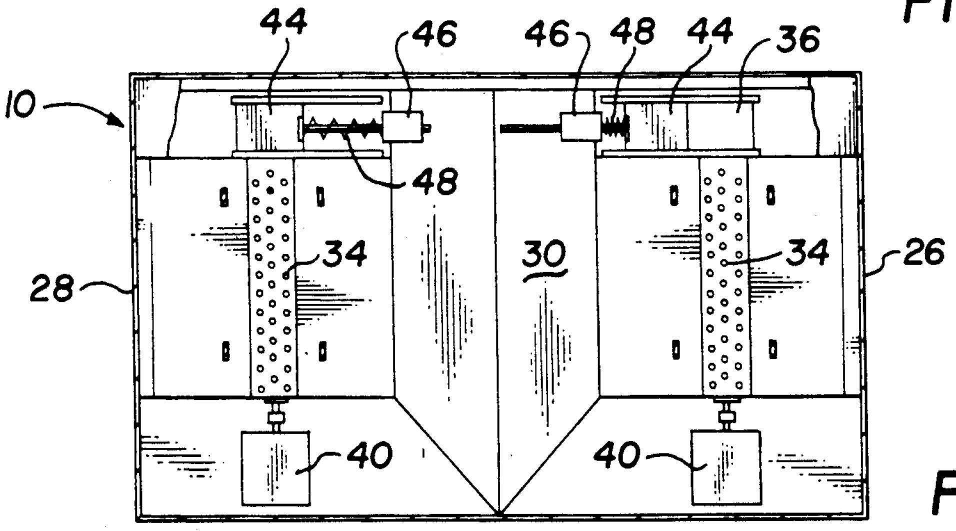
FIG. 5 is a cross-sectional view taken generally along the line of 5—5 of FIG. 1 illustrating the arrangement and structure of the rodent-proof doors covering the discharge openings in the housing.

FIG. 5 is a cross-sectional view looking upwardly from beneath the sloping bottom 30 to more fully illustrate the perforated plates 34 and also to illustrate dispenser doors 44 for covering the openings 36. The doors 44 are moveable between open and closed positions with respect to the discharge openings 36. As illustrated, each door 44 is arranged to be moved to the open position by a solenoid 46 and returned to the closed position by a spring 48. The door 44 shown on the right side of FIG. 5 is shown in the open position.

Figure 6:
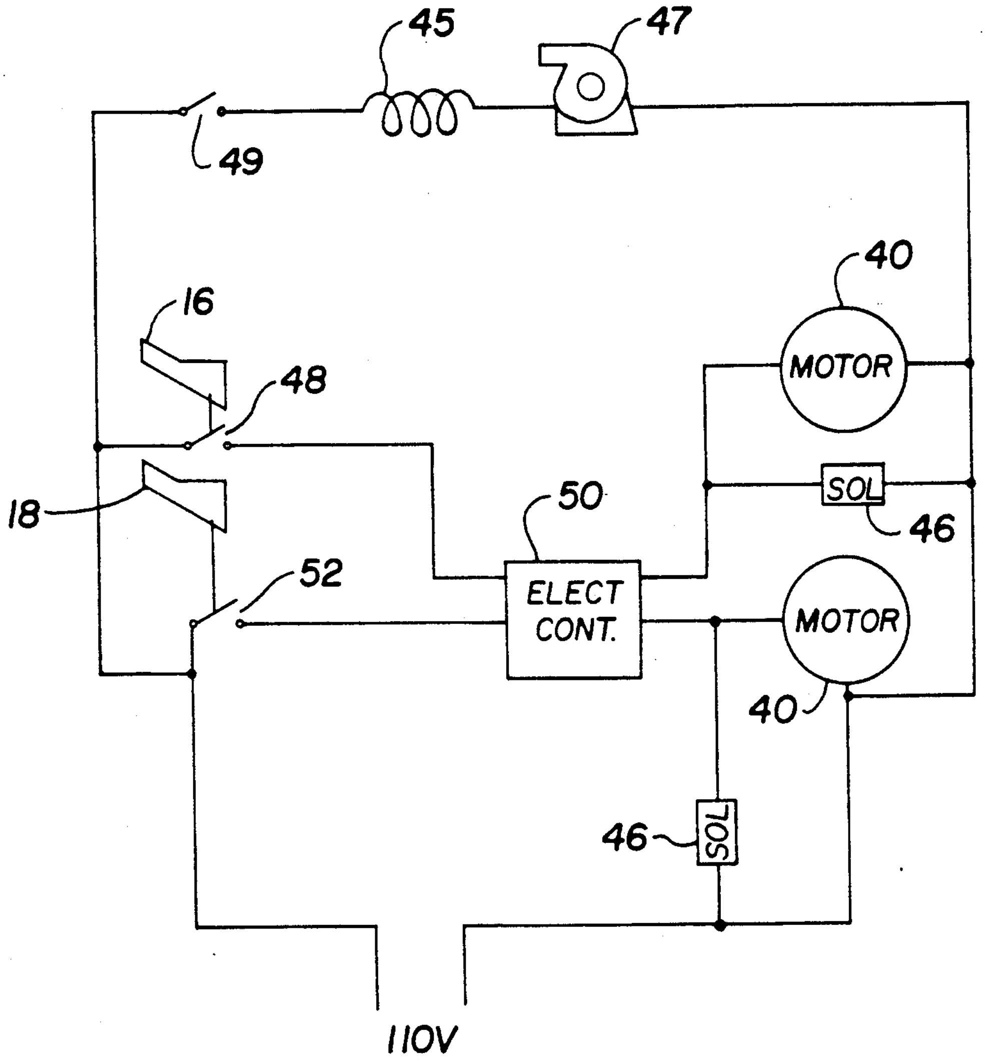
FIG. 6 is a schematic diagram illustrating very generally the arrangement of the electronic control, screw conveyor motors, and a door operating solenoids.

FIG. 6 illustrates a schematic circuit for controlling the rotation of the conveyor screws 38 and for controlling the opening and closing of the doors 44. As shown therein, the coin slot 16 includes a microswitch 48 that is actuated by the passage of a coin through the slot 16 to complete a circuit through an electronic control module 50. Actuation of the control module 50 causes one of the motors 40 and to rotate the attached conveyor screw 38. Simultaneously, the solenoid 46 operating the door 44 adjacent to that screw is caused to open.

The electronic control module 50 is designed so that for a given quantity of coins passing through the coin slot 16, the motor 40 is caused to operate for a predetermined length of time, moving particulate comestibles toward the open discharge opening 36. The module 50 also actuates the solenoid 46 to move appropriate door 44 to the position wherein the opening 36 is uncovered.

The electronic control module 50 is arranged to coordinate the rotation of the motor 40 and the actuation of the solenoid 46 so that the desired quantity of particulate comesibles will be discharged. An essentially identical circuit controls the remaining screw 38 and door 44 through a microswitch 52 which actuates the other motor 44 through the electronic control module 50. Manifestly, the screws 38 can be actuated alone or both can be actuated at the same time.

FIG. 6 also illustrates a schematic circuit for the heater 45 and blower 47. As shown, the heater 45 and blower 47 are connected in series with a switch 49 so that the switch 49 can be utilized to turn the heater 45 and blower 47 on and off.

In the operation of the vending machine 10, a person desiring to purchase, for example popped corn, places one of the containers (not shown) under the discharge opening 36 of the appropriate screw 38 and inserts a coin into the slot 16 or 18 as appropriate. Upon closure of the appropriate miscroswitch, 16 or 18, the electronic controller module 50 sends a signal to the motor 40 and the solenoid 46 causing the screw 38 to rotate and the door 44 to open. As the screw 38 rotates, popped corn is moved across the perforated plate 34 toward the opening 36. As the popped corn moves across the perforated plate 34, broken or small particles thereof, such as unpopped kernels, are exposed to the perforations in the plate 34 and drop therethrough into the receptacle 32 located thereinbelow. Accordingly, the purchaser of the popped corn will receive a high quality product free of unpopped kernels and small particles.

From the foregoing, it should be apparent that a vending machine constructed as described in detail hereinbefore will provide for the accurate dispensing of the desired quantity of particulate comestible while excluding therefrom undersized particles.

Having described but a single embodiment of the invention, it will be understood that many changes and modifications can be made thereto without departing from the spirit or scope of the invention.

What is claimed:

1. A machine for vending particulate comestibles comprising:

a housing having a top, two sides, a front, a rear, and a sloping bottom holding said particulate comestibles for permitting said comestibles to gravitate toward the lowest part of said bottom, wherein said bottom includes a plurality of perforations smaller than an acceptable particulate size whereby undersized particulates pass through said perforations;

a blower for forcing air upwardly through the perforations in said bottom;

a generally horizontally disposed screw conveyor located proximate the lowest part of said sloping bottom and journaled in said housing;

a discharge opening in said housing adjacent to one end of said screw conveyor;

motor means for rotating said screw conveyor;

coin slot means in said housing for receiving coins to actuate said motor means; and control means interposed between said motor means and coin slot means for controlling the rotation of said conveyor by said motor means thereby controlling the quantity of particulate comestible delivered through said opening by said conveyor.

2. The machine of claim 1 wherein said machine also includes a receptacle for receiving the undersized particulates passing through said perforations.

3. The machine of claim 2 wherein said particulate comestible is corn and also including corn popping means in said housing located to dump popped corn onto said sloping bottom.

4. The machine of claim 1 wherein:

said bottom includes a plurality of sloping surfaces forming a pair of conveyor troughs having a discharge opening adjacent to one end of each; and, said machine includes a screw conveyor rotatably located in each trough with an end adjacent to one of said discharge openings.

5. The machine of claim 4 wherein said particulate comestible is corn and also including corn popping means in said housing located to dump popped corn onto the sloping surfaces of said bottom.

6. The machine of claim 5 and also including:

closure means moveable between open and closed positions for selectively opening and closing each said discharge opening;

actuating means operably connected with said control means for moving each said closure means independently from the closed to the open position when said conveyors are operating permitting discharge of said popped corn through said discharge openings; and, return means connected with each said closure means for urging said closure means toward said closed position.

7. The machine of claim 1, further comprising a heater for heating the air to be forced through the perforations.

* * * * *